(12) United States Patent
Swarnkar et al.

(10) Patent No.: US 7,930,450 B1
(45) Date of Patent: *Apr. 19, 2011

(54) BUFFER MANAGEMENT SYSTEM AND METHOD

(75) Inventors: Jitendra Kumar Swarnkar, San Jose, CA (US); Jie Du, Santa Clara, CA (US); Vincent Wong, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,061

(22) Filed: Jul. 6, 2010

Related U.S. Application Data

(63) Continuation of application No. 11/877,410, filed on Oct. 23, 2007, now Pat. No. 7,752,356.

(60) Provisional application No. 60/863,061, filed on Oct. 26, 2006.

(51) Int. Cl.
*G06F 3/00* (2006.01)
*G11B 5/09* (2006.01)

(52) U.S. Cl. .......................................... 710/52; 360/51
(58) Field of Classification Search ................... 710/52; 360/51

See application file for complete search history.

(56) References Cited

U.S. PATENT DOCUMENTS

| | | | |
|---|---|---|---|
| 4,920,478 A | 4/1990 | Furuya et al. | |
| 5,450,546 A | 9/1995 | Krakirian | |
| 5,539,897 A | 7/1996 | Samanta et al. | |
| 5,551,054 A * | 8/1996 | Packer | 710/23 |
| 5,634,099 A * | 5/1997 | Andrews et al. | 709/212 |
| 5,717,918 A * | 2/1998 | Takayama et al. | 1/1 |
| 6,178,471 B1 * | 1/2001 | Barrett et al. | 710/52 |
| 6,693,753 B2 | 2/2004 | Su et al. | |
| 7,120,084 B2 * | 10/2006 | White et al. | 365/189.16 |
| 2003/0191982 A1 * | 10/2003 | Arakawa et al. | 714/8 |
| 2005/0125608 A1 * | 6/2005 | Grimsrud et al. | 711/113 |
| 2006/0160982 A1 * | 7/2006 | Ishii et al. | 528/86 |

* cited by examiner

*Primary Examiner* — Henry W Tsai
*Assistant Examiner* — Hyun Nam (57) ABSTRACT

The transfer of data from a host computer to a recordable disk in a disk drive operating on the host computer is managed. A buffer for temporarily storing data to be transferred between the host computer and the recordable disk is maintained, wherein the buffer comprises a plurality of host segments and a plurality of disk segments, and wherein each of the host segments and disk segments have a sector count value associated therewith. In a case where the transfer of data corresponds to a host segment, the host segment is selected from the plurality of host segments in the buffer. In a case where the transfer of data corresponds to a disk segment, the disk segment is selected from the plurality of disk segments in the buffer. In a case where a host segment is selected, the sector count value of the selected host segment is adjusted. In a case where a disk segment is selected, the sector count value of the selected disk segment is adjusted. Thus, the amount of hardware resources is seen to be reduced, and expansion of segmentation is seen to be improved.

10 Claims, 8 Drawing Sheets

BUFFER MANAGEMENT SYSTEM AND METHOD

CROSS-REFERENCE TO RELATED APPLICATION

This application is a continuation of U.S. Nonprovisional patent application Ser. No. 11/877,410, filed Oct. 23, 2007, entitled "BUFFER MANAGEMENT SYSTEM AND METHOD," which claims the benefit of U.S. Provisional Patent Application No. 60/863,061, filed Oct. 26, 2006, entitled "BUFFER MANAGER DESIGN SPECIFICATION," the entire specifications of which are hereby incorporated by reference in their entirety for all purposes, except for those sections, if any, that are inconsistent with this specification.

BACKGROUND

1. Field of the Invention

The invention relates to buffer management, and more particularly to managing the transfer of data from a host computer to a recordable disk in a disk drive operating on the host computer using a buffer.

2. Description of the Related Art

A disk drive typically includes one or more magnetic disks. Each disk typically has a number of concentric rings or tracks on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding for a read or write operation. Data is accessed serially, one bit at a time and typically, each disk has its own read/write head.

The disk drive is connected to a disk controller, which is the circuit that allows a host computer to communicate with the disk drive. The disk controller performs numerous functions, for example, converting digital data to analog head signals, disk formatting, error checking and fixing, logical to physical address mapping and data buffering. To perform the various functions for transferring data, the disk controller includes numerous components.

Typically, the data buffering function is used to transfer data between the host computer and the disk. Data buffering is needed because the speed at which the disk drive can supply data or accept data from the host is different than the speed at which the host can correspondingly read or supply data. Conventional systems include a buffer memory that is coupled to the disk controller. The buffer memory temporarily stores data that is being read from or written to the disk drive.

Conventionally, when data is read from the disk drive, a host system sends a read command to the disk controller, which stores the read command into the buffer memory. Data is read from the disk drive and stored in the buffer memory, and transferred from the buffer memory to the host system.

In this regard, different buffer management techniques have been used to manage the access of data to and from the buffer. What is desired is an efficient management of data transfer from a host computer to a recordable disk drive, using a memory buffer.

SUMMARY OF THE INVENTION

According to one aspect of the invention, the transfer of data from a host computer to a recordable disk in a disk drive operating on the host computer is managed. A buffer for temporarily storing data to be transferred between the host computer and the recordable disk is maintained, wherein the buffer comprises a plurality of host segments and a plurality of disk segments, and wherein each of the host segments and disk segments have a sector count value associated therewith. In a case where the transfer of data corresponds to a host segment, the host segment is selected from the plurality of host segments in the buffer and the sector count value of the selected host segment is adjusted. In a case where the transfer of data corresponds to a disk segment, the disk segment is selected from the plurality of disk segments in the buffer and the sector count value of the selected disk segment is adjusted. Accordingly, the invention is seen to provide a counter for each active thread. Thus, the invention is seen to reduce hardware resources, and to improve expansion of segmentation.

If the host segment selected by the host segment selector and the disk segment selected by the disk segment selector are in a streaming mode, a single sector count value corresponding to both the selected disk segment and the selected host segment can be adjusted. The management of the transfer of data can be incorporated within a disk controller having a CPU, where the CPU of the disk controller is adapted to adjust the sector count value for any of the host segments, the disk segments, the first counter and the second counter. Sector sizes associated with a selected host and disk segment can be adjusted to match each other.

The plurality of host segments can comprise eight host segments, and the plurality of disk segments can comprise four disk segments. Each of the host segments and disk segments can have a registry to store their respective sector count value. A sector count value for a selected host or disk segment can be adjusted by incrementing or decrementing the appropriate sector count value, and the adjusted sector count value can be stored in the registry for the selected host segment or disk segment.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

Figure 1:
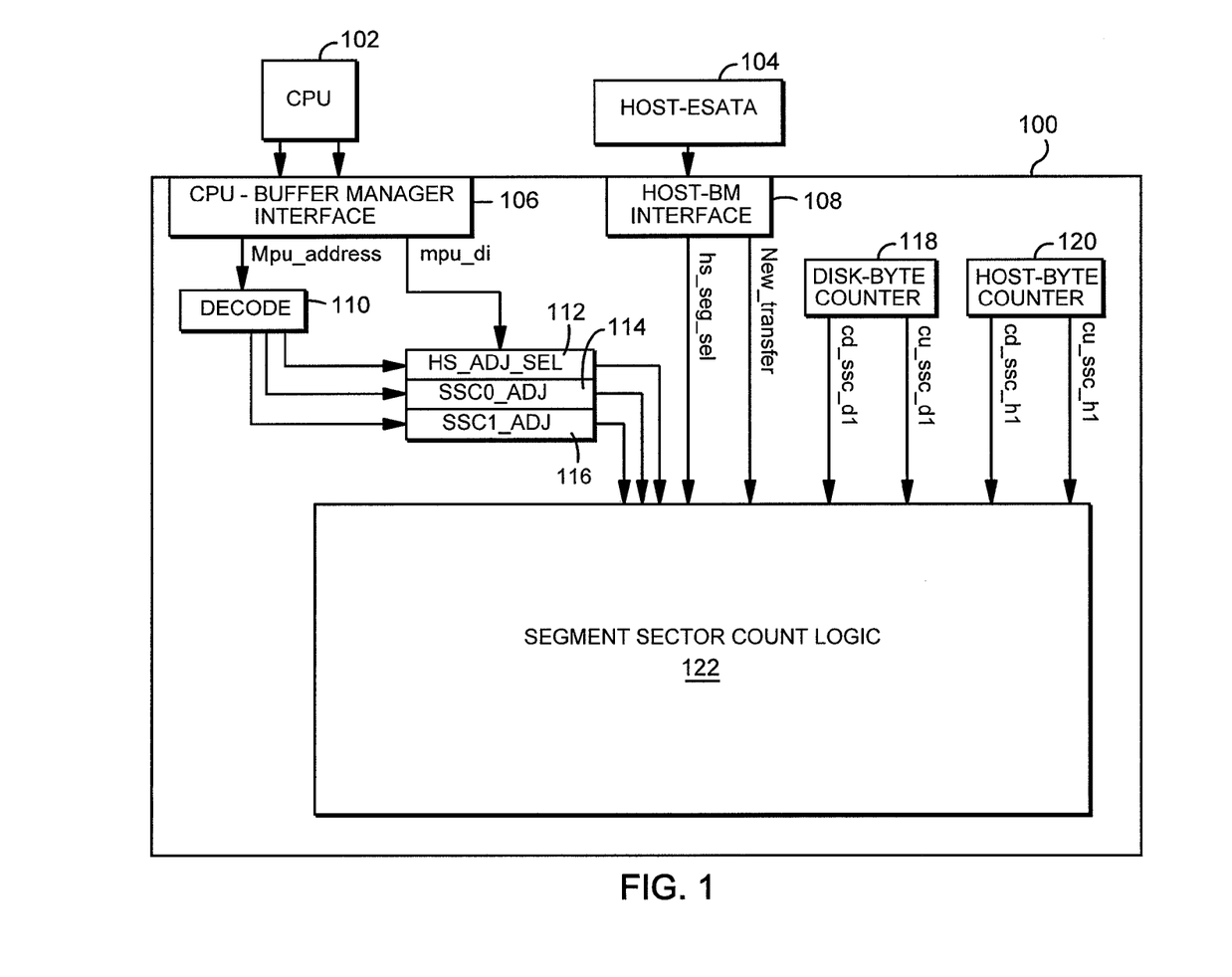
FIG. 1 is a block diagram of a buffer manager, in accordance with a representative embodiment of the invention.

FIG. 1 is a block diagram of a buffer manager 100, in accordance with a representative embodiment of the invention. Buffer manager 100 is preferably included within a disk controller (not shown), which is the circuit that allows a host computer to communicate with the hard disk, or other kind of disk drive. Buffer manager 100 can interface with CPU 102, which is also included within the disk controller. Buffer manager can also interface with the host computer, which corresponds with Host ESATA module 104.

CPU 102 interfaces with buffer manager 100 via CPU-Buffer manager interface 106, which is included within buffer manager 100. Data provided from CPU 102 to buffer manager 100 is preferably in the form of mpu_address data, which corresponds with address information, and mpu_di data, which corresponds with data input. The mpu_address data is decoded by decoder 110, and the decoded mpu_address data and mpu_di data are used to generate the data variables of hs_adj_sel 112 (host adjust select), ssc0_adj 114 (segment sector count 0 adjust) and ssc1_adj 116 (segment sector count 1 adjust). These data variables are used by segment sector count logic module 122, and will be described in greater detail later with reference to FIG. 2.

Host ESATA module 104 interfaces with buffer manager 100 via Host-BM interface 108, which is included within buffer manager 100. Data provided from the host to buffer manager 100 is preferably in the form of data variable hs_seg_sel (host segment select), and new_transfer. These data variables are used by segment sector count logic module 122, and will be described in greater detail later with reference to FIG. 2.

Buffer manager 100 also includes a disk-byte counter 118 and host-byte counter 120. Disk-byte counter 118 can provide data in the form of cd_ssc_d1 (count-down segment sector count disk) and cu_ssc_d1 (count-up segment sector count disk) to segment sector count logic module 122. Host-byte counter 120 can provide data in the form of cd_ssc_h1 (count-down segment sector count host) and cu_ssc_h1 (count-up segment sector count host) to segment sector count logic module 122. These data variables will be described in greater detail with reference to FIG. 2.

Figure 3:
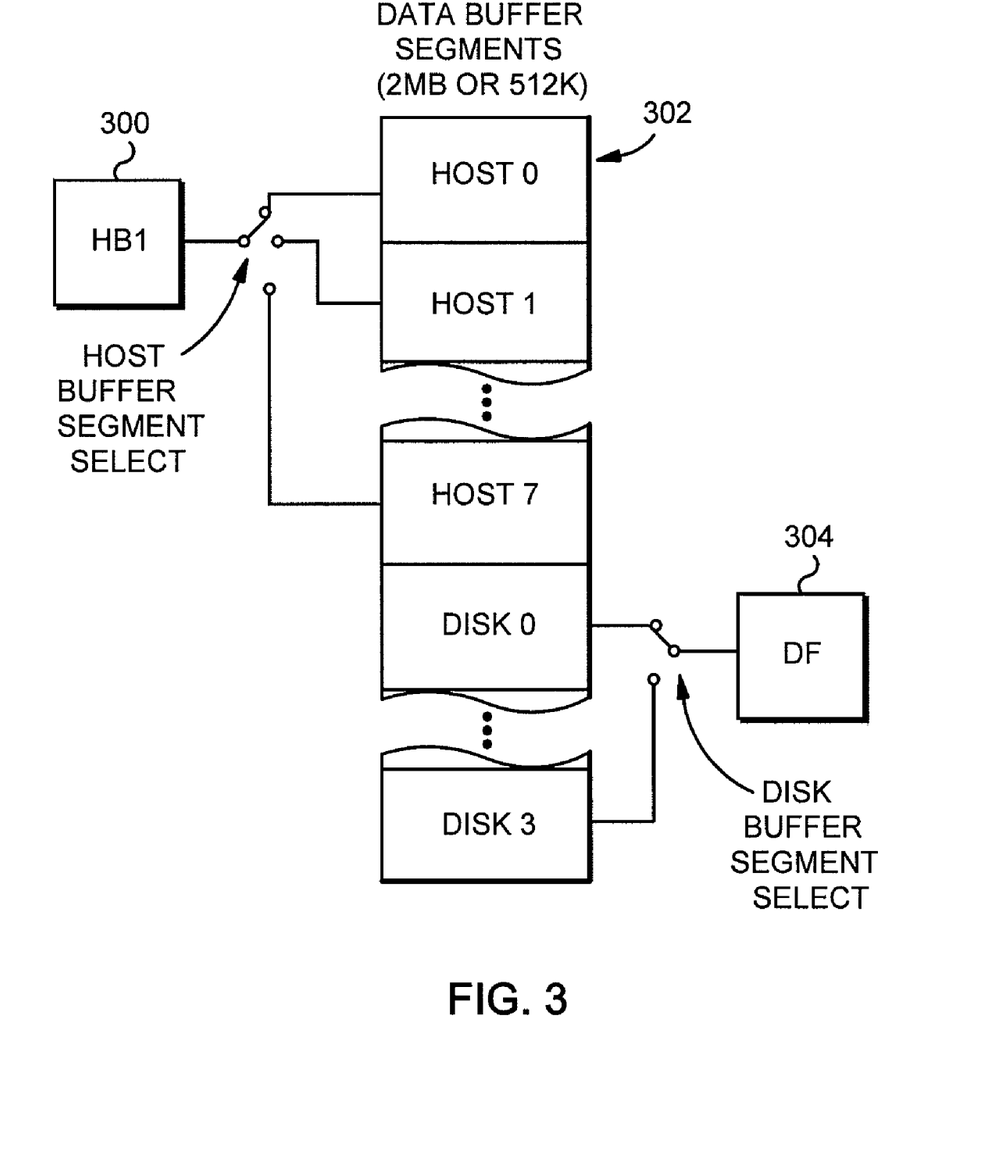
FIG. 3 is a block diagram depicting host and disk buffer segments in a data buffer, in accordance with a representative embodiment of the invention.

Segment sector count logic module 122 logic of FIG. 1 manages the sector count for each of the host segments and the disk segments associated with data transfer. In this regard, a segment refers to the portion of memory which may be addressed by a single index register without changing a segment selector. For example, different commands from the host can correspond with different host segments, and different commands from the disk can correspond with different disk segments. Each segment has a respective size and location within the memory buffer. FIG. 3 depicts host and disk buffer segments 302 of the data buffer, together with host buffer segment selector 300 and disk buffer segment selector 304, in accordance with a representative embodiment of the invention.

Each of the host segments and disk segments have a count value associated therewith. The count value represents the amount of buffer space (e.g., number of sectors in a buffer) for a particular segment. For example, a sector count of 0 suggests that the buffer for that segment is empty, and a maximum sector count suggests that no buffer space is available for that segment. As data is read or written to disk, the count value of the segments are incremented or decremented to reflect the current amount of buffer space. In this regard, two counters can be used to adjust count values of host and disk segments.

Figure 2:
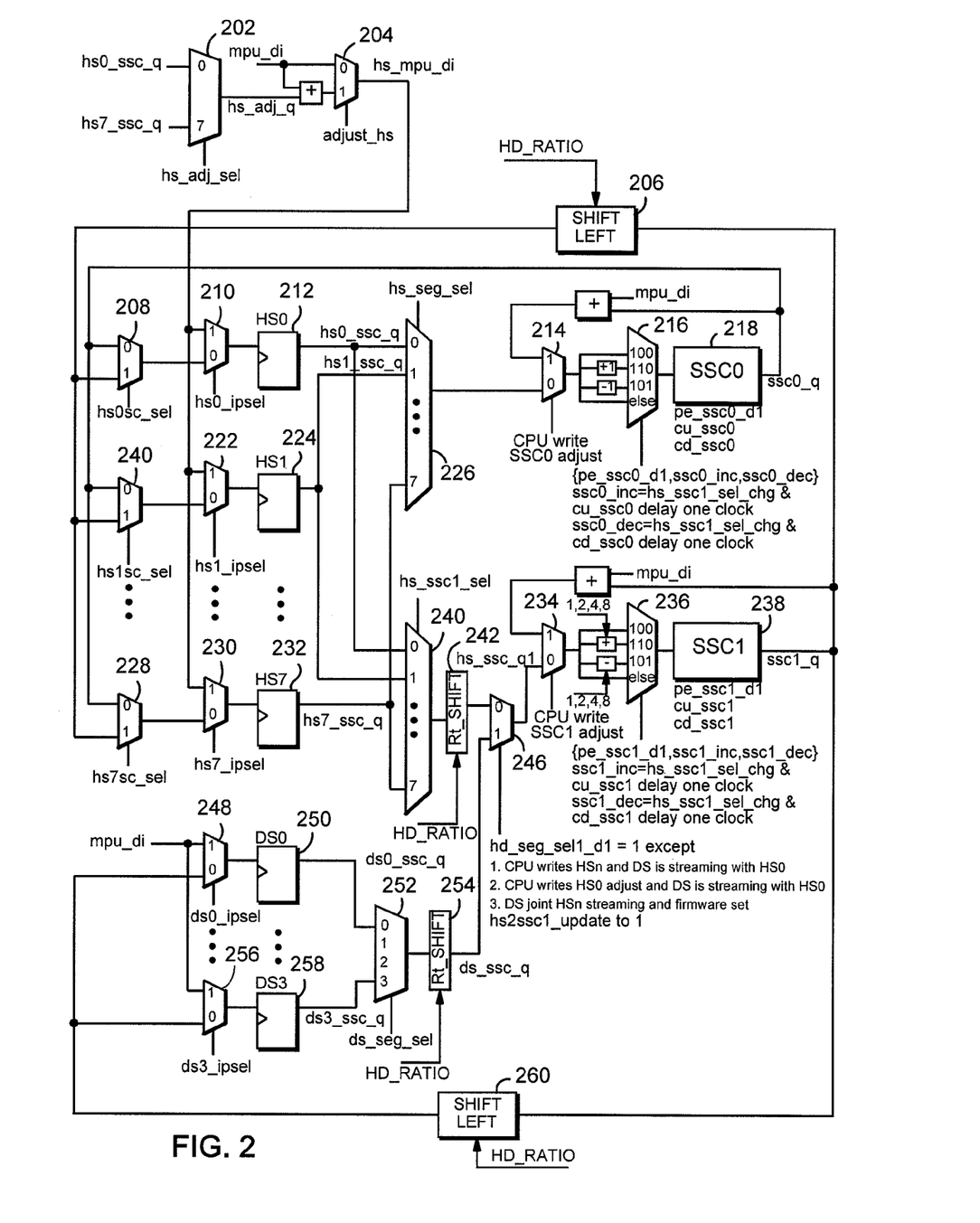
FIG. 2 is a schematic diagram of a segment sector count logic module of FIG. 1, in accordance with a representative embodiment of the invention.

Referring now to FIG. 2, a schematic diagram of the segment sector count logic module 122 of FIG. 1, in accordance with a representative embodiment of the invention, is shown.

CPU 102 can adjust the count value for any of the host or disk segments, and can adjust the count value for any of the counters. In this regard, CPU 102 allocates the amount of space and size for the buffer, and performs memory management for the buffer. For example, if an active stream requires more data than currently available in the buffer, then CPU 102 attempts to allocate more data for the stream. In doing so, count values for the host segments and the counters may need to be updated, and the CPU performs such updating.

CPU 102 adjusts the count value for any of the eight host segments using hs_adj_sel value 112 at multiplexer 202. Multiplexers 202 and 204 are used to select the host segment to be adjusted, based on the hs_adj_sel value 112 from CPU 102.

In this regard, current count values for the eight host segments are stored in registries HS0 through HS7. These registries correspond with elements 212, 224 and 232, although each of HS0 through HS7 is not necessarily depicted in FIG. 2. The actual registry values, which correspond to the current count values, are indicated by the hs0_ssc_q through hs7_ssc_q values. To adjust the count values stored in registries HS0 through HS7, the appropriate value from hs0_ipsel through hs7_ipsel is used. The hs0_ipsel through hs7_ipsel values correspond with multiplexers 210, 222 and 230.

Likewise, current count values for the four disk segments are stored in registries DS0 through DS3. These registries correspond with elements 250 and 258, although each of DS0 through DS3 is not necessarily depicted in FIG. 2. The actual registry values, which correspond to the current count values, are indicated by the ds0_ssc_q through ds3_ssc_q values. To adjust the count values stored in registries DS0 through DS3, the appropriate ds0_ipsel through ds3_ipsel value is used. The ds0_ipsel through ds3_ipsel values correspond with multiplexers 248 and 256.

To update the value of segment counters SSC0 and SSC1, which are used to update the count value for an active stream (s), CPU 102 uses ssc0_adj 114 and ssc1_adj 116 values from FIG. 1. These values correspond with multiplexers 214 and 234, respectively, in FIG. 2. The actual values of segment counters SSC0 and SSC1 are indicated by ssc0_q and ssc1_q, respectively.

Turning to a request by the host to transfer data to the recordable disk, the host will select a host segment for the data transfer. The selected segment corresponds to the active stream. In this regard, the hs_seg_sel value of FIG. 1, corresponding with multiplexer 226 in FIG. 2, is obtained from the host and is used to select the desired host segment. The new_transfer value of FIG. 1 is a boolean indicating whether or not a new host segment is desired. In other words, if new_transfer is "true", the value of hs_seg_sel should be changed. If new_transfer is "false", the current value of hs_seg_sel should not be changed.

The hs0sc_sel through hs7sc_sel values, which correspond with multiplexers 208, 220 and 228, are used to switch between a non-stream and a stream mode. In this regard, a stream mode indicates that the host and disk are respectively writing and reading to the same area in the buffer. For example, if HS0 and HS5 are active streams, and if HS0 is streaming with the disk, HS0 will use the SSC1 counter and HS5 will use the SSC0 counter. The determination of which counter to use is based on the values of hs0sc_sel and hs5sc_sel.

When streaming, selection of the appropriate host segment for counter SSC1 238 is performed using the hs_ssc1_sel value, rather than the hs_seg_sel value. In other words, hs_seg_sel is used to select a host segment when not streaming, and hs_ssc1_sel is used to select a host segment when streaming. As can be seen in FIG. 2, hs_ssc1_sel (corresponding with multiplexer 240) is associated with counter SSC1 238, which is used when the host and disk are in stream mode. Further, hs_seg_sel (corresponding with multiplexer 226) is associated with counter SSC0 218, which is used when the host is not streaming with the disk.

FIG. 2 also depicts the use of four disk segments DS0 through DS3. When the disk instead of the host wants to transfer data (e.g., read from the disk), the disk will select a disk segment for the data transfer. The selected disk segment corresponds to the active stream. The ds_seg_sel value, which corresponds to multiplexer 252, is used to select the desired disk segment. If a disk segment is active, it will be associated with counter SSC1.

FIG. 3 is a diagram depicting host and disk buffer segments in a data buffer, in accordance with a representative embodiment of the invention. As can be seen in this diagram, host buffer interface 108 is capable of selecting between one of 8 host segments Host 0 to Host 7. Further, DF 304 is capable of selecting between one of 4 disk segments Disk 0 to Disk 3. For example, if Host 0 and Disk 3 are in streaming mode, counter SSC1 can be used to keep track of the count for both of the Host 0 and Disk 3 segments. Since the segments are in stream mode, they are typically in the same space in the memory buffer.

Depending on whether the buffer manager is in stream mode, one or both of counters SSC0 and SSC1 are used for updating the count of the active stream(s). If only one host segment is selected, counter SSC0 is used for that segment and counter SSC1 is not used. If only one disk segment is selected, counter SSC1 is used for that segment and counter SSC0 is not used. If one host and one disk segment are selected, counter SSC1 is used for both the host segment and disk segment, while counter SSC0 can be used for an additional host segment.

As noted above, the count represents the number of available sectors in a buffer for a given segment. When transfer of data to or from the recordable disk occurs, the number of bytes transferred is counted. This applies to both host and disk segments. Once the number of bytes reaches the boundary for the size of a sector (e.g., 512K, 1 MB, 2 MB), the counter SSC0 and/or SSC1 should be incremented or decremented. In this regard, variables cd_ssc_d1 and cu_ssc_d1 respectively correspond to counting down or counting up for disk byte counter 118 of FIG. 1, and variables cd_ssc_h1 and cu_ssc_h1 respectively correspond to counting down or counting up for host byte counter 120. These variables are more generally represented as cu_ssc0, cd_ssc0, cu_ssc1 and cd_ssc1 in FIG. 2, since it is possible for counter SSC1 to increment count values for both a host segment and a disk segment.

It is possible that the boundary for the size of a sector differs between host and disk. For example, the host may define a sector boundary at 512K, while the disk uses a 1 MB or 2 MB sector boundary. Accordingly, multiplexers 216 and 236 are used to select a ratio difference between a host segment and a disk segment in streaming mode. These multiplexers are positioned before counters SSC0 and SSC1, respectively, and allow for selection of sector size ratios of one segment to be 1, 2, 4 or 8 times that of another segment. This ratio allows for the translation or shifting of sector sizes for segments, and the ratio is passed down through shift left values 206 and 260, and through shift right values 242 and 254.

Accordingly, buffer manager 100 is seen to provide a counter for each active thread. Furthermore, buffer manager 100, which includes segment sector counter logic 122, is seen to reduce hardware resources, and to improve expansion of segmentation.

Figure 4:
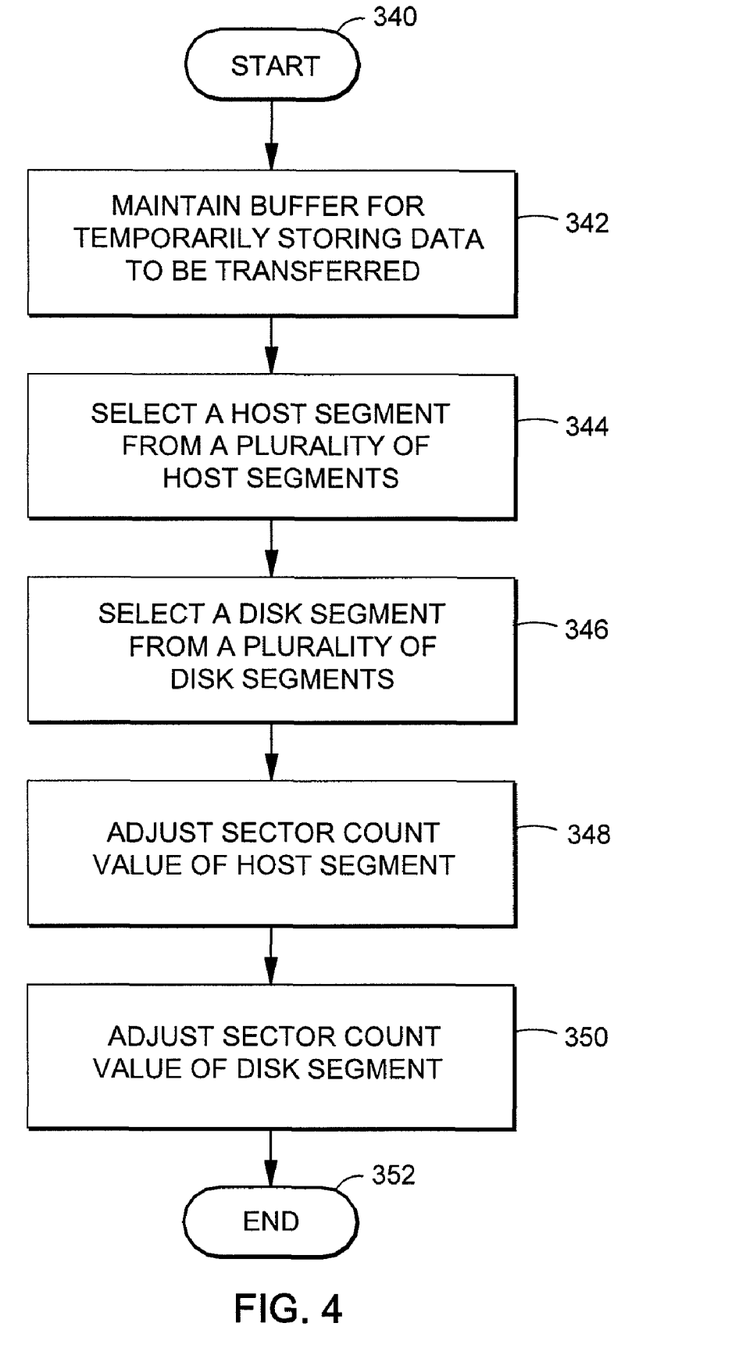
FIG. 4 is a flowchart depicting the management of the transfer of data from a host computer to a recordable disk in a disk drive operating on the host computer, in accordance with a representative embodiment of the invention.

FIG. 4 is a flowchart depicting the management of the transfer of data from a host computer to a recordable disk in a disk drive operating on the host computer, in accordance with a representative embodiment of the invention. Following start bubble 340, a buffer for temporarily storing data to be transferred between the host computer and the recordable disk is maintained (block 342). The buffer comprises a plurality of host segments and a plurality of disk segments, and each of the host segments and disk segments have a sector count value associated therewith. The plurality of host segments can comprise eight host segments, and the plurality of disk segments can comprise four disk segments. Additionally, each of the host segments and disk segments can have a registry to store their respective sector count value.

In a case where the transfer of data corresponds to a host segment, the host segment is selected from the plurality of host segments in the buffer (block 344). In a case where the transfer of data corresponds to a disk segment, the disk segment is selected from the plurality of disk segments in the buffer (block 346).

In a case where a host segment is selected, the sector count value of the selected host segment is adjusted (block 348). In a case where a disk segment is selected, the sector count value of the selected disk segment is adjusted (block 350). In this regard, a sector count value for a selected host or disk segment can be adjusted by incrementing or decrementing the sector count value, and the adjusted sector count value can be stored in the registry for the selected host segment or disk segment. The process then ends (end bubble 352).

It should be noted that if the host segment selected in block 344 and the disk segment selected in block 346 are in a streaming mode, a single sector count value corresponding to both the selected disk segment and the selected host segment can be adjusted. Additionally, sector sizes associated with a selected host and disk segment can be adjusted to match each other.

The above process steps can be performed within a disk controller having a CPU, and the CPU of the disk controller can be adapted to adjust the sector count value for any of the host segments, the disk segments, the first counter and the second counter.

Figure 5A:
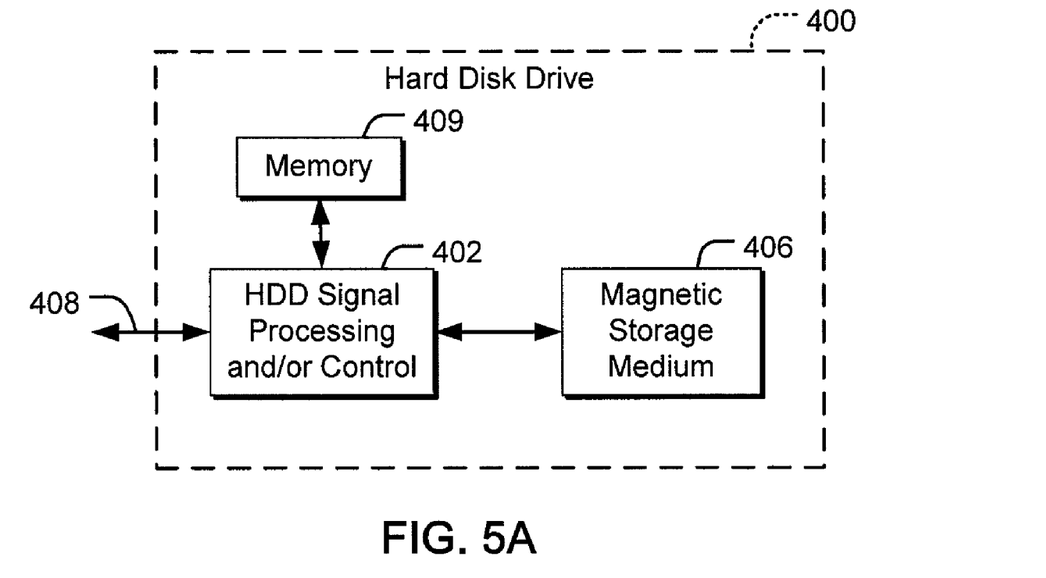
FIG. 5A is a block diagram showing an embodiment of the invention in a hard disk drive (HDD).

Referring now to FIGS. 5A to 5G, various exemplary implementations of the present invention are shown. Referring to FIG. 5A, the present invention may be embodied in a hard disk drive 400. The present invention may implement either or both signal processing and/or control circuits, which are generally identified in FIG. 5A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408. HDD 400 may be connected to memory 409, such as random access memory (RAM), a low latency nonvolatile memory such as flash memory, read only memory (ROM) and/or other suitable electronic data storage.

Figure 5B:
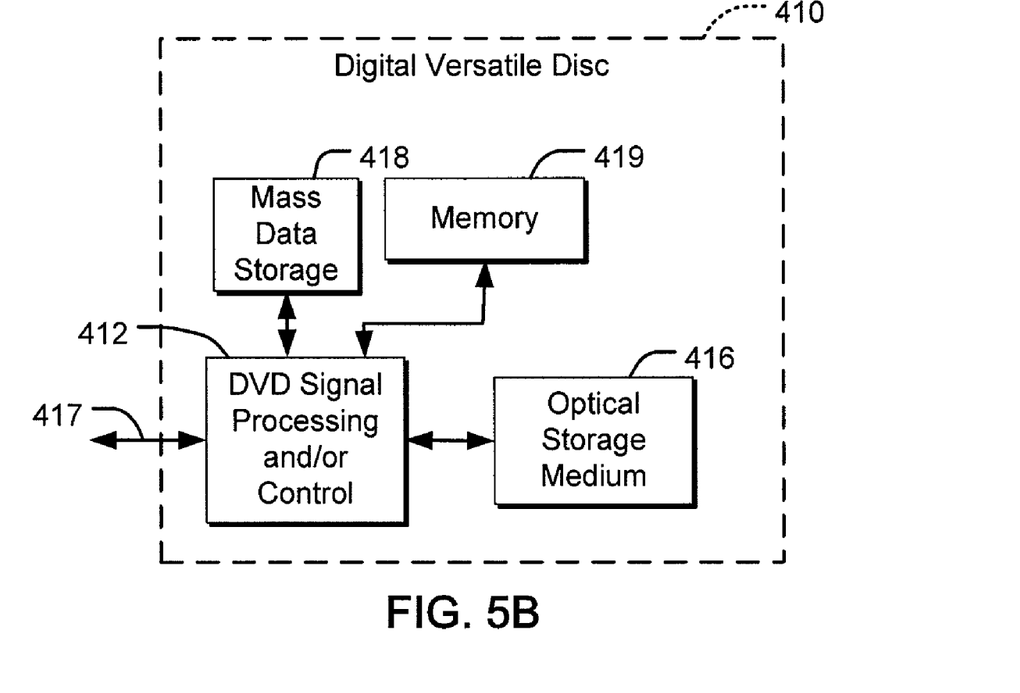
FIG. 5B is a block diagram showing an embodiment of the invention in a digital versatile disk (DVD) drive.

Referring now to FIG. 5B, the present invention may be embodied in a digital versatile disc (DVD) drive 410. The present invention may implement either or both signal processing and/or control circuits, which are generally identified in FIG. 5B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417. DVD 410 may communicate with mass data storage 418 that stores data in a nonvolatile manner. Mass data storage 418 may include a hard disk drive (HDD) such as that shown in FIG. 5A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 5C:
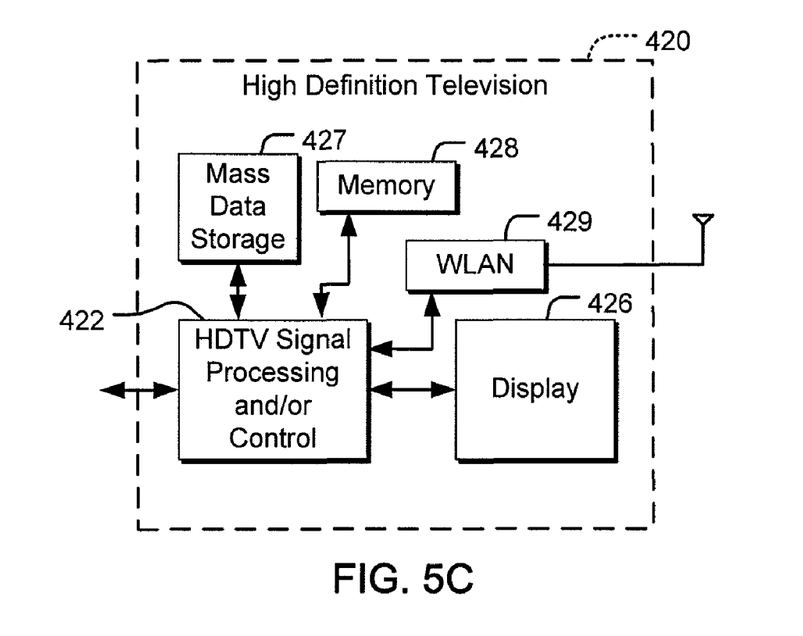
FIG. 5C is a block diagram showing an embodiment of the invention in a high definition television (HDTV).

Referring now to FIG. 5C, the present invention may be embodied in a high definition television (HDTV) 420. The present invention may implement either or both signal processing and/or control circuits, which are generally identified in FIG. 5C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 5A and/or at least one DVD may have the configuration shown in FIG. 5B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 5D:
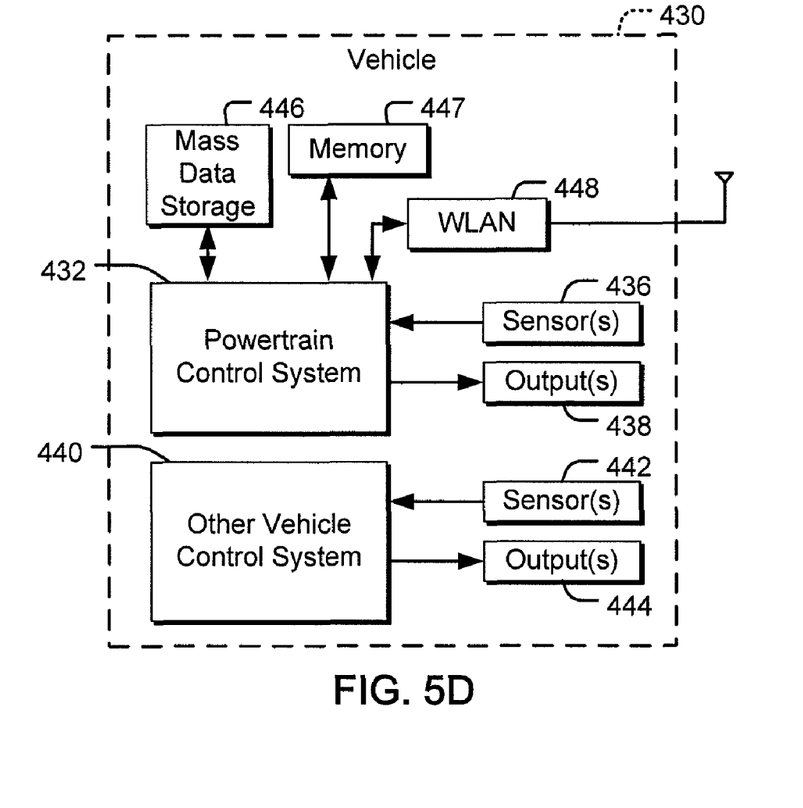
FIG. 5D is a block diagram showing an embodiment of the invention in a vehicle control system.

Referring now to FIG. 5D, the present invention implements a control system of a vehicle 430, a WLAN interface and/or mass data storage of the vehicle control system. In some implementations, the present invention implements a powertrain control system 432 that receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 5E:
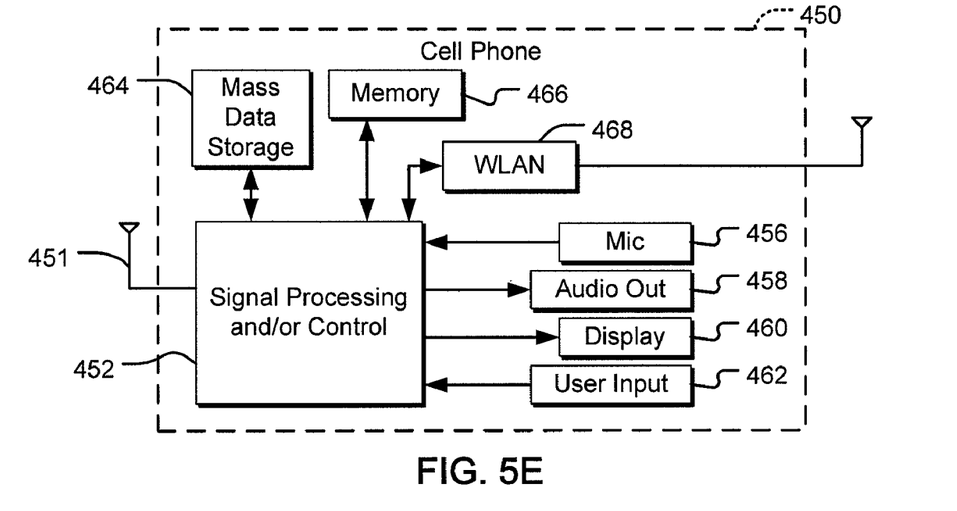
FIG. 5E is a block diagram showing an embodiment of the invention in a cellular or mobile phone.

Referring now to FIG. 5E, the present invention may be embodied in a cellular phone 450 that may include a cellular antenna 451. The present invention may implement either or both signal processing and/or control circuits, which are generally identified in FIG. 5E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 5F:
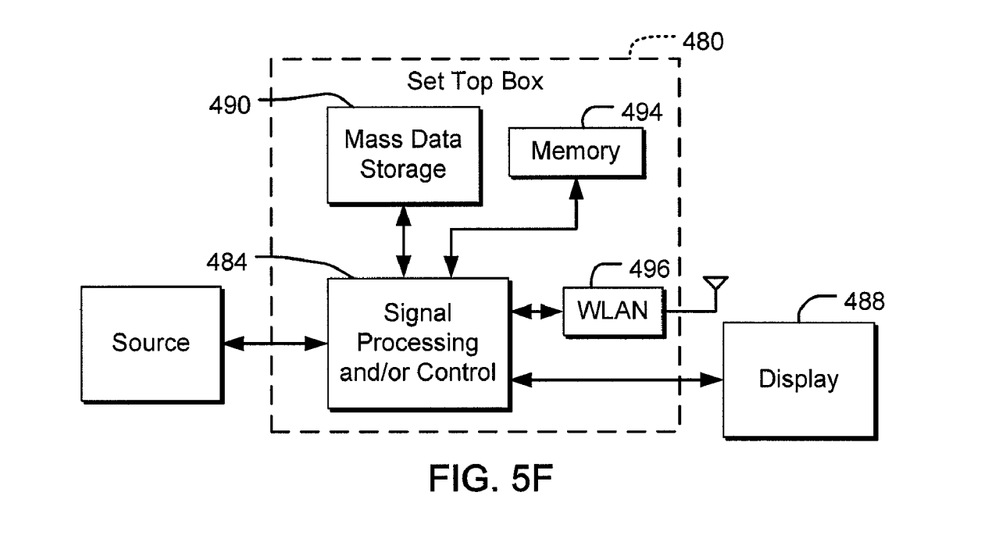
FIG. 5F is a block diagram showing an embodiment of the invention in a set-top box (STB).

Referring now to FIG. 5F, the present invention may be embodied in a set top box 480. The present invention may implement either or both signal processing and/or control circuits, which are generally identified in FIG. 5F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 5G:
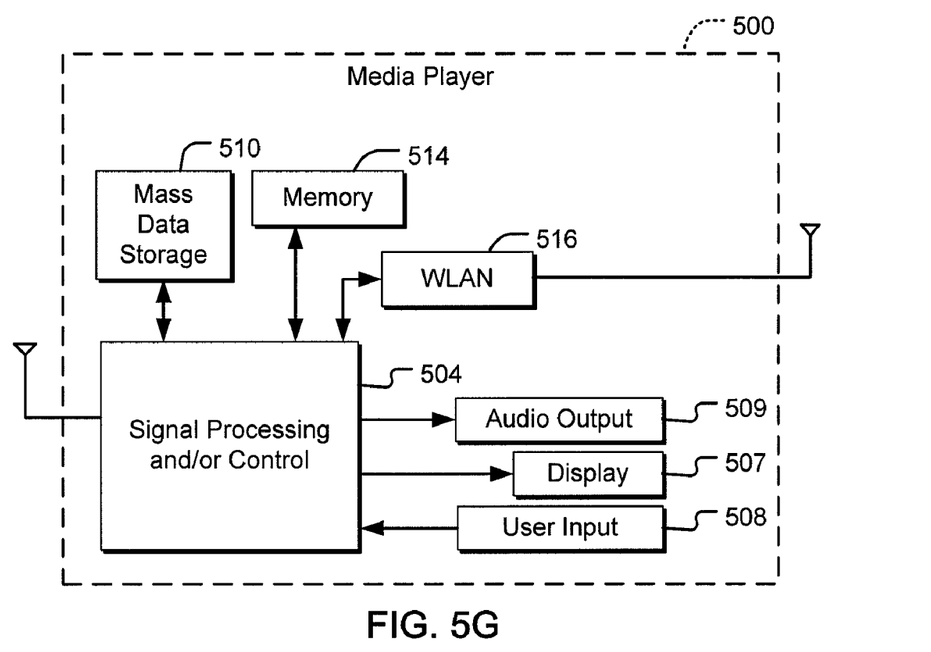
FIG. 5G is a block diagram showing an embodiment of the invention in a media player.

Referring now to FIG. 5G, the present invention may be embodied in a media player 500. The present invention may implement either or both signal processing and/or control circuits, which are generally identified in FIG. 5G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 5H:
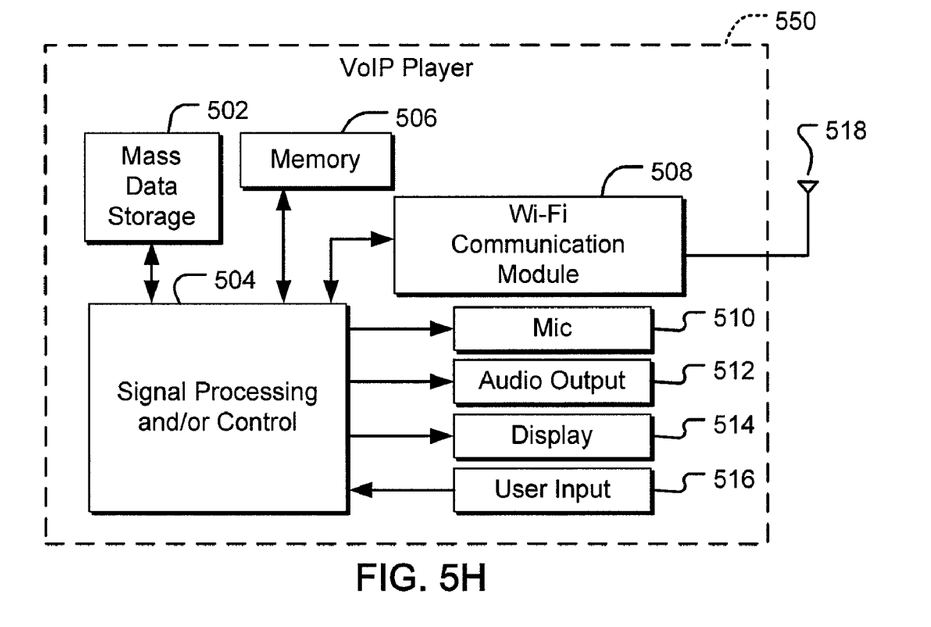
FIG. 5H is a block diagram showing an embodiment of the invention in a voice over IP (VoIP) phone.

Referring to FIG. 5H, the present invention may be embodied in a Voice over Internet Protocol (VoIP) phone 550 that may include an antenna 518. The present invention may implement either or both signal processing and/or control circuits, which are generally identified in FIG. 5H at 504, a wireless interface and/or mass data storage of the VoIP phone 550. In some implementations, VoIP phone 550 includes, in part, a microphone 510, an audio output 512 such as a speaker and/or audio output jack, a display monitor 514, an input device 516 such as a keypad, pointing device, voice actuation and/or other input devices, and a Wireless Fidelity (Wi-Fi) communication module 508. Signal processing and/or control circuits 504 and/or other circuits (not shown) in VoIP phone 550 may process data, perform coding and/or encryption, perform calculations, format data and/or perform other VoIP phone functions.

VoIP phone 550 may communicate with mass data storage 502 that stores data in a nonvolatile manner such as optical and/or magnetic storage devices, for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". VoIP phone 550 may be connected to memory 506, which may be a RAM, ROM, low latency nonvolatile memory such as flash memory and/or other suitable electronic data storage. VoIP phone 550 is configured to establish communications link with a VoIP network (not shown) via Wi-Fi communication module 508.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. An apparatus for managing the transfer of data from a host computer to a recordable disk in a disk drive, the apparatus comprising:
   a buffer for storing data to be transferred between the host computer and the recordable disk, wherein the buffer comprises a plurality of host segments and a plurality of disk segments, and wherein each of the plurality of host segments and each of the plurality of disk segments has a corresponding sector count value;
   a host segment selector for selecting, in a case where the transfer of data corresponds to a host segment, the host segment from the plurality of host segments;
   a disk segment selector for selecting, in a case where the transfer of data corresponds to a disk segment, the disk segment from the plurality of disk segments;
   a first sector counter for adjusting, in a case where a host segment is selected, the sector count value of the selected host segment;
   a second sector counter for adjusting, in a case where a disk segment is selected, the sector count value of the selected disk segment;
   a first sector size adjuster for adjusting a sector size associated with the selected host segment; and
   a second sector size adjuster for adjusting a sector size associated with the selected disk segment,
   wherein, if the selected host segment and the selected disk segment are in a streaming mode, at least one of the first sector size adjuster and the second sector size adjuster adjusts the sector sizes such that the sector size associated with the selected host segment matches the sector size associated with the selected disk segment.

2. An apparatus according to claim 1, wherein the apparatus is included within a disk controller having a central processing unit (CPU), and wherein the CPU of the disk controller is configured to adjust the sector count value for at least one of the host segments, the disk segments, the first sector counter, and the second sector counter.

3. An apparatus according to claim 1, wherein the plurality of host segments comprises eight host segments and the plurality of disk segments comprises four disk segments.

4. An apparatus according to claim 1, wherein each of the host segments and disk segments has a registry to store their respective sector count values.

5. An apparatus according to claim 1, wherein the first and second sector counters adjust their respective sector count values by incrementing or decrementing the sector count values, and wherein the adjusted sector count values are stored in the registry for the selected host segment and selected disk segment.

6. A method for managing the transfer of data from a host computer to a recordable disk in a disk drive, the method comprising:

maintaining a buffer for storing data to be transferred between the host computer and the recordable disk, wherein the buffer comprises a plurality of host segments and a plurality of disk segments, and wherein each of the plurality of host segments and each of the plurality of disk segments has a corresponding sector count value;

first selecting, in a case where the transfer of data corresponds to a host segment, the host segment from the plurality of host segments in the buffer;

second selecting, in a case where the transfer of data corresponds to a disk segment, the disk segment from the plurality of disk segments in the buffer;

first adjusting, in a case where a host segment is selected, the sector count value of the selected host segment;

second adjusting, in a case where a disk segment is selected, the sector count value of the selected disk segment;

first adjusting a sector size; and second adjusting a sector size, wherein at least one of the first adjusting a sector size and the second adjusting a sector size adjusts sector sizes associated with a selected host segment and disk segment to match each other.

7. A method according to claim 6, wherein the method is performed within a disk controller having a central processing unit (CPU), and wherein the CPU of the disk controller is configured to adjust the sector count value for at least one of the host segments, the disk segments, the first counter and the second counter.

8. A method according to claim 6, wherein the plurality of host segments comprises eight host segments and the plurality of disk segments comprises four disk segments.

9. A method according to claim 6, wherein each of the host segments and disk segments has a registry to store their respective sector count values.

10. A method according to claim 6, wherein the first adjusting and the second adjusting comprise adjusting their respective sector count values by incrementing or decrementing the sector count values, and wherein the adjusted sector count values are stored in a registry for the selected host segment and selected disk segment.

* * * * *